United States Patent [19]

Ikeuchi et al.

[11] Patent Number: 4,744,128
[45] Date of Patent: May 17, 1988

[54] APPARATUS FOR MOLDING A FOOD PRODUCT

[75] Inventors: Hiroji Ikeuchi; Kiyoaki Ikeuchi, both of Akashi, Japan

[73] Assignee: Kabushiki Kaisha Ikeuchi Tekkosho, Akashi, Japan

[21] Appl. No.: 78,261

[22] Filed: Jul. 27, 1987

[30] Foreign Application Priority Data

Jan. 6, 1987 [JP] Japan .................................. 62-815

[51] Int. Cl.⁴ .............................................. A22C 7/00
[52] U.S. Cl. ........................................ 17/32; 425/451.9
[58] Field of Search ...................... 17/32; 99/483, 440, 99/441, 442, 380; 425/451.9, 441, 442, DIG. 221

[56] References Cited

U.S. PATENT DOCUMENTS 333,229 12/1885 Jaeger .................................... 99/380
3,674,897 7/1972 Bianco ..................................... 17/32

Primary Examiner—Willie G. Abercrombie
Attorney, Agent, or Firm—Marshall, O'Toole, Gerstein, Murray & Bicknell

[57] ABSTRACT

A food product mold apparatus for producing a food product, for example resembling the shelled meat of shellfish, including two elongated mold halves which when fitted together form a series of multiple food product mold cavities. Devices are provided for holding together the two ends of the mold halves. The mold halves include reinforcement ribs located at intervals along the outer sides of the mold halves, and a rod is mounted lengthwise along the backside of each mold half in such a manner that the reinforcement ribs are in contact with the steel rod. The ends of the rods are secured to the ends of the mold halves and the rods are held under tension and press against the center areas of the mold halves.

6 Claims, 2 Drawing Sheets

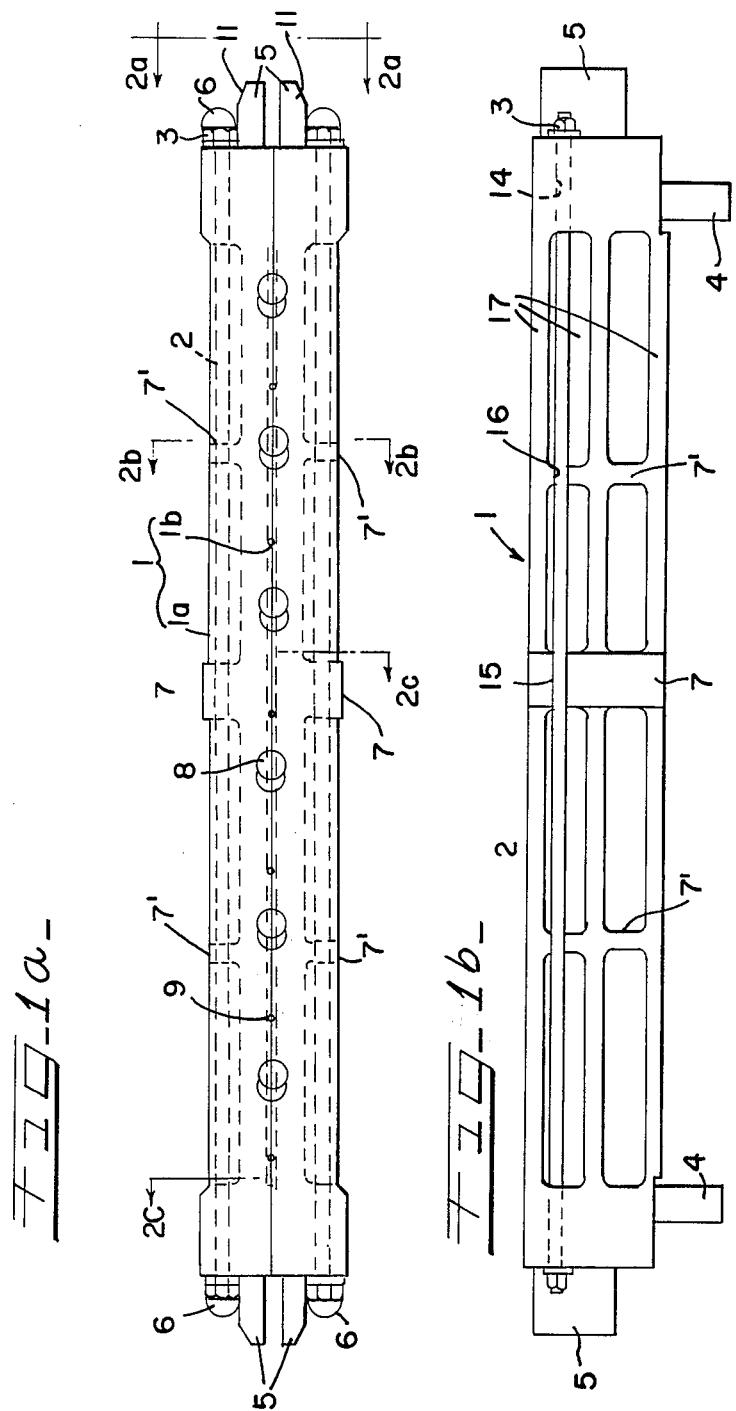

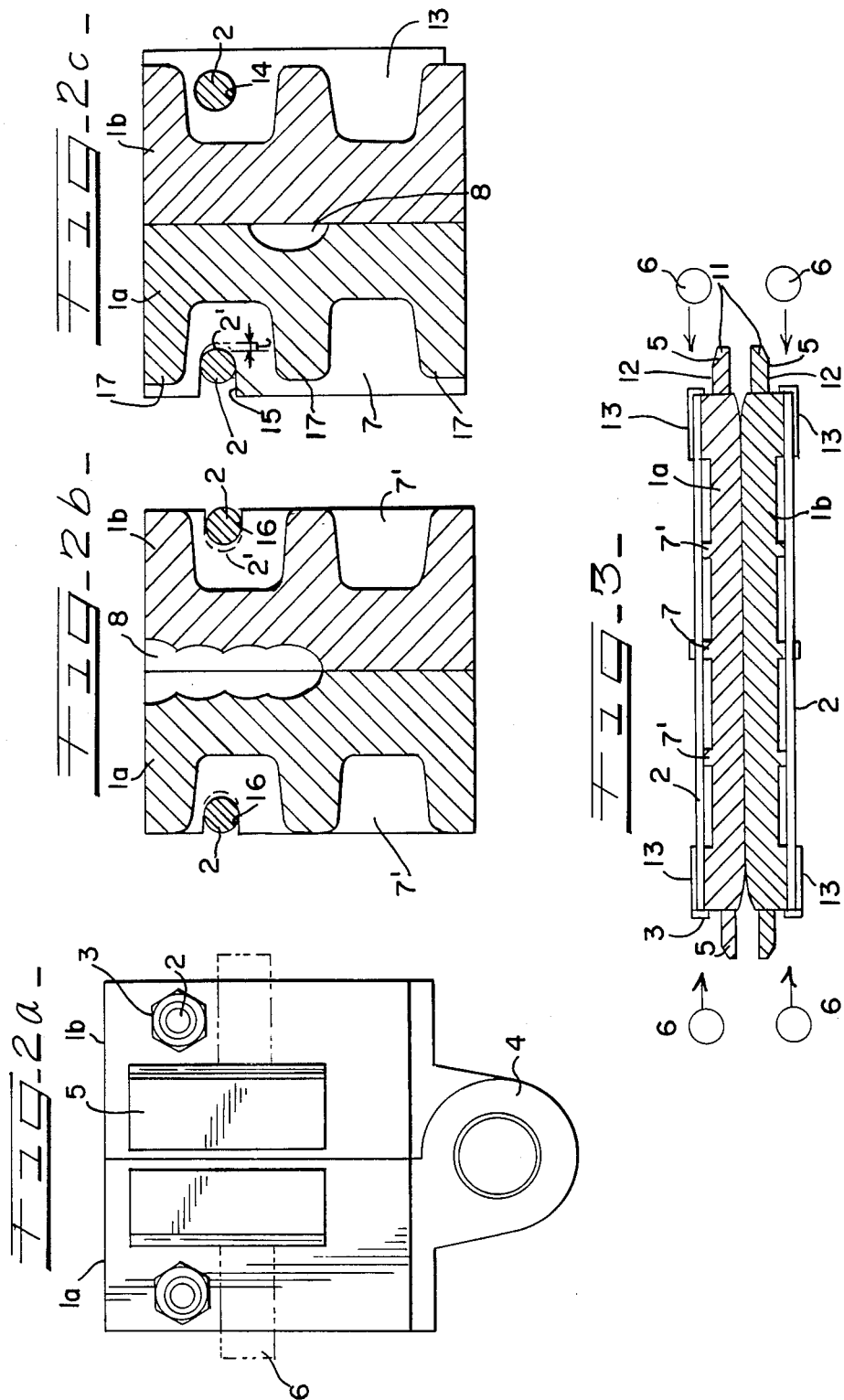

APPARATUS FOR MOLDING A FOOD PRODUCT

FIELD AND BACKGROUND OF THE INVENTION

This invention relates to apparatus for producing food products having the appearance of the shelled meat of shellfish, such as shrimp, crab, lobster and abalone, by molding and processing a paste of ground fish meat.

In the past, molds used to produce food products resembling the appearance of the shelled meat of shellfish were used by fitting together two elongated aluminum mold halves which form a series of multiple food product mold cavities, injecting under pressure a raw food paste into the mold, and then heating the mold. Such molds have been provided with hinges along one lengthwise side in order to allow the two mold halves to be opened and closed, and the two unhinged ends of the mold have been secured in order to prevent the mold halves from opening. However, in the past when the molds were filled with the raw food paste, the two mold halves would instantly open a slight amount, thus causing the food product to have an edge around it when it is heated and removed from the mold. The presence of an edge around the food product decreased the value of the product because it is not sufficiently authentic in appearance and thus necessitates a procedure to removed the edge.

Usually either six to eight individual molds are arranged in a frame, or multiple food product mold cavities are formed in a single mold and these are all opened and closed simultaneously. In order to initially prevent the formation of this edge, the number of these molds or cavities can be reduced to three or four, thus reducing the span of the mold which has to be clamped together and increasing the strength provided to resist the internal pressure tending to open the molds; or the speed at which the raw food paste is injected can be reduced in order to prevent the internal pressure from increasing excessively. In either case, however, there is a resulting drop in productivity.

Another measure which might be considered in an effort to prevent the formation of an edge around the food product is to shape the edges of each mold cavity so that they interlock, but this expedient not only would make formation of the molds more complex, an edge might still be formed around the product if there were any gaps in the mold joints.

A design in which tapered parts are provided to hold both sides of the mold when the paste injection nozzles descend during the injection of the raw food paste and thus prevent the opening of the mold is disclosed in the applicants' U.S. patent application Ser. No. 879,984 filed on June 30, 1986. However, as the closure of the mold tended to open between the tapered parts, this design has not been a perfect solution.

Although each of the methods used in the past had advantages of its own, there were also such disadvantages as a complicated construction, reduced productivity, etc. The pressure especially tends to increase when the raw food paste being injected into the mold cavities is highly viscous and lacks fluidity. The pressure working to push open the mold is particularly strong in mold cavities such as those shaped in the form of a shrimp, where the cross-sectional area gradually decreases as the paste is injected. There is also a considerable amount of force caused by the expansion of the food product during heating of the mold. Prior art mechanisms have not been able to deal with these forces.

SUMMARY OF THE INVENTION

This invention comprises a food product mold apparatus for producing a food product resembling the shelled meat of shellfish, comprising two mold halves which when fitted together form a series of multiple food product mold cavities, means for holding together the two ends of said mold halves, said mold halves including reinforcement ribs located at intervals along said mold halves, and a rod mounted lengthwise along the back of each mold half in such a manner that said reinforcement ribs are in contact with and are pressed by said steel rod, and the ends of said rods being secured to the ends of said mold halves. The mold is preferably made of aluminum and the rods are preferably made of steel.

During operation, when the two aluminum mold halves are fitted together and both ends are held together, and the raw food paste is injected under pressure into the food product cavities, the steel rods provided on the backs of the mold halves act through the reinforcement ribs located on the backs of the mold halves to compress the center area of the mold halves lengthwise along the mold, thus preventing the mold from bending when the raw food paste is injected. The mold and the rods are made of different materials and have different coefficients of thermal expansion. When the mold is heated, because the heat expansion of the mold is greater than that of the rods, although the raw food paste expands during the heating of the mold and acts to push open the mold and bend the mold in one direction, the rods cause the mold to bend in the opposite direction. Thus, the contact surfaces of the mold halves are caused to fit together even more strongly, and the forces acting to open the mold are suppressed.

BRIEF DESCRIPTION OF THE DRAWINGS

This invention will be better understood from the following detailed description taken in conjunction with the accompanying figures of the drawings, wherein:

FIG. 1a is a plan view of a mold in accordance with this invention;

FIG. 1b is a side view of the mold;

FIG. 2a is a view taken on the line 2a—2a in FIG. 1a;

FIG. 2b is a cross-sectional view taken on the line 2b—2b in FIG. 1a;

FIG. 2c is a cross-sectional view taken on the line 2c—2c in FIG. 1a; and

FIG. 3 is a cross-sectional view of the mold prior to the securing of the two ends.

DETAILED DESCRIPTION OF THE DRAWINGS

The mold 1 comprises two elongated mold halves 1a and 1b which are connected together along one edge by hinges 4. The two halves have a plurality of mold cavities 8 formed between them (see FIGS. 2b and 2c) on the adjacent sides of the halves, and the cavities are connected to air escape holes 9. The halves 1a and 1b may be pivoted on the hinges 4 between a closed position shown in the drawings wherein a food product may be injected into the cavities, and an open position (not illustrated) wherein the cavities are exposed and the food product may be removed.

To lock or hold the two halves 1a and 1b together, each half has end fixtures or projections 5 formed at both ends (see FIGS. 1a, 1b and 3). The outer ends of the fixtures are beveled as indicated at 11. A pair of roller cams 6 are movably mounted adjacent each end of the mold and are movable between an unlocked position shown in FIG. 3 and a locked position shown in FIG. 1a. The roller cams 6 of each pair are secured together in fixed spaced relation, and the space between the roller cams 6 of each pair is slightly less than the unflexed distance between the outer surfaces 12 of the fixtures 5. When a pair of roller cams 6 is forced over the associated pair of fixtures 5, the fixtures are forced toward each other and tightly clamp the ends of the mold.

With reference to FIGS. 2c and 3, on the outer sides of the halves are formed end flanges 13 which are located at the ends of the halves. For each of the halves, midway between the end flanges 13 of each half is a center rib 7, and a quarter rib 7' is formed approximately midway between the center rib 7 and each of the end flanges 13. In addition, longitudinally extending side and center flanges 17 are provided.

Along the back or outer side of each half 1a and 1b is mounted a rod 2 which extends through holes 14 (see FIGS. 1b and 2c) formed through the end flanges 13. Grooves 15 (FIG. 2c) are formed in the outer surfaces of the ribs 7, and grooves 16 (FIG. 2b) are formed in the outer surfaces of the ribs 7'. The holes 14 and the grooves 15 and 16 of each half are substantially in alignment and the rod 2 extends through them, and the outer ends of each rod are secured tightly to the flanges 13 by nuts 3.

The mold halves 1a and 1b are preferably made of aluminum and the rods 2 are preferably made of steel.

When the mold 1 is to be opened, the cam followers 6 are separated left and right from the two ends of the mold (see FIG. 3). When the mold 1 is closed, the cams move horizontally toward the ends of the halves and squeeze the mold's end fixtures 5 together (see FIG. a) so that the mold will not open. The steel rods 2 provided along the backs or outer sides of the mold halves 1a and 1b are tightly secured at the two ends of the mold by the nuts 3. The relationship between the steel rods and the mold's reinforcement ribs 7 and 7' is, as shown in FIGS. 2b and c, such that they are in close contact with each other. In order to make this a perfect contact, the bottoms of the grooves of the ribs 7 and 7' which contact the steel rods 2 are formed so that they project out a distance t (FIG. 2c) of approximately 1 mm from a straight line drawn through the innermost portions of the holes 14 when the rods 2 are not in place. Thus, when the rods 2 are tightened, the mold halves bend or curve slightly as shown in exaggerated form in FIG. 3. In other words, when the mold halves 1a and 1b are placed together, the two ends of the mold are somewhat open at the ends as shown in FIG. 3 because of the tension of the rods.

Consequently, when the ends of the mold halves are brought together by the cam followers 6, the two mold halves 1a and 1b fit together very tightly along their entire length. The tightness of this fit can be adjusted by the degree to which the nuts 3 are tightened. Before tightening the cams 6 on the fixtures 5, the rods 2 are substantially straight, but when the ends of the mold halves are clamped together, the two flanges 13 at each end of the mold are bent toward each other and the rods are placed under high tension and they curve toward each other at their ends slightly. This slight curvature of the rods causes them to bear with increased force against the ribs 7 and 7', and they press the center areas of the mold halves tightly together.

Even when a highly viscous raw paste of a ground food product is injected under pressure into the food product cavities of the closed mold, because the mold halves are strongly compressed together by the steel rods, the molds will not be forced open by the pressurized injection of the ground food product.

Furthermore, an additional advantage is obtained when the coefficient of linear expansion due to heat of the mold halves is greater than that of the rods 2. When heated the mold halves will tend to lengthen more than the rods. This will cause greater tension on the rods 2, and the contact force between the rods and the ribs will increase and press the mold halves more tightly together. In the present specific example, the mold halves are made of aluminum and the rods are made of steel which has a smaller coefficient of thermal expansion than aluminum. Thus, when this mold is heated, because the expansion of the aluminum mold and that of the steel rods along the backs of the mold are different, the contact surfaces of the mold halves will be pressed together even more strongly, thus preventing any gaps in the contact surfaces and ensuring the production of a high quality food product without any worrisome edges.

With this invention, because there are no gaps in the contact surfaces of the mold, even though the production process may be otherwise the same, it is possible to heat the mold and achieve a food product with no edge around it, thus making the invention extremely effective.

What is claimed is:

1. Apparatus for molding a food product, comprising two mold halves having opposite ends, each of said halves further having inner and outer surfaces, said inner surfaces having mold cavities formed therein, cam means for securing together said ends of said halves, and each of said halves having a tensioned rod mounted thereon on said outer surface, said rods having ends secured to said opposite ends of said halves and engaging said outer sides of said halves between said outer ends.

2. Apparatus according to claim 1, and further including reinforcing ribs on said outer sides of said halves, said rods engaging said reinforcing ribs.

3. Apparatus according to claim 2, wherein said ribs extend outwardly beyond a straight line between the ends of said rods when said rods are untensioned.

4. Apparatus according to claim 1, wherein said halves and said rods are made of metal, and the coefficient of heat expansion of said halves is greater than the coefficient of heat expansion of said rods.

5. Apparatus according to claim 4, wherein said halves are made of aluminum and said rods are made of steel.

6. Apparatus according to claim 1, and further including fastener means securing said rods to said opposite ends of said halves, said fastener means being adjustable for varying the tension in said rods.

* * * * *